F. R. COLLINS.
EGG BEATER.
APPLICATION FILED SEPT. 26, 1917.
1,320,603. Patented Nov. 4, 1919.
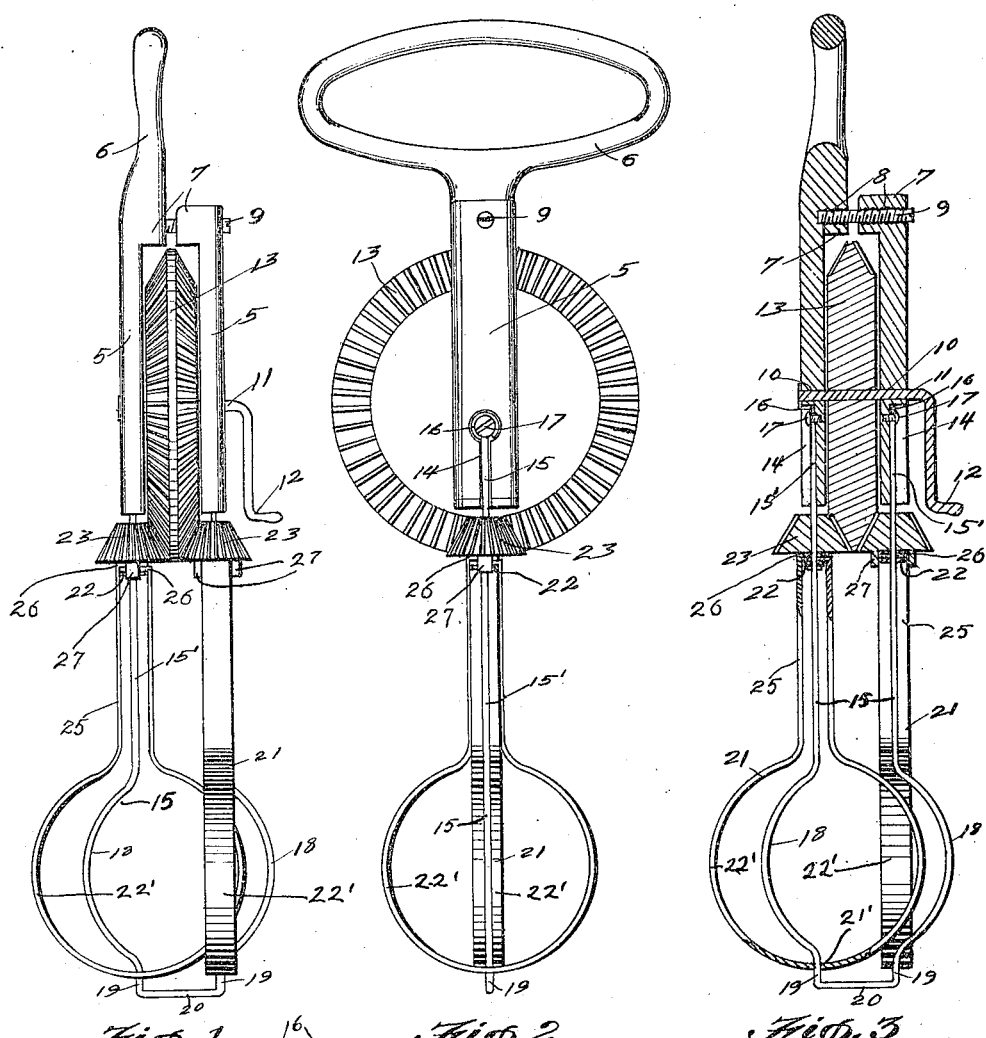
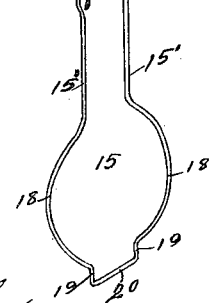
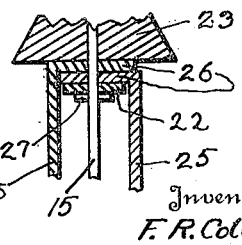
Inventor
F. R. Collins

UNITED STATES PATENT OFFICE.

FRANK R. COLLINS, OF HUNTER, NORTH DAKOTA.

EGG-BEATER.

1,320,603.  Specification of Letters Patent.  Patented Nov. 4, 1919.

Application filed September 26, 1917. Serial No. 193,254.

*To all whom it may concern:*

Be it known that I, FRANK R. COLLINS, a citizen of the United States, residing at Hunter, in the county of Cass, State of North Dakota, have invented certain new and useful Improvements in Egg-Beaters; and I do hereby declare the following to be a full, clear, and exact description of the invention, such as will enable others skilled in the art to which it appertains to make and use the same.

This invention is an improvement in churning apparatus and has particular reference to an egg beater.

An object of the invention is to provide an egg beater of simple and inexpensive construction and having an improved mounting for the beating elements whereby the same may be simultaneously rotated in opposite directions and be effectively retained in operative position.

The inventive idea involved is capable of receiving a variety of mechanical expressions, one of which for the purpose of illustrating the invention, is shown in the accompanying drawing, wherein:—

Figure 1 is a side elevation of the beater constructed in accordance with the invention.

Fig. 2 is a view at right angles to Fig. 1.

Fig. 3 is a vertical view, partly in section.

Fig. 4 is a detail perspective view of the frame for supporting the beating elements.

Fig. 5 is a detail section of the mounting of the beaters and gears.

The invention is illustrated in what is now believed to be its preferred form which includes a body portion consisting of a pair of oppositely disposed standards or arms 5 in the form of elongated bars, one of said standards having its upper end extended to provide a handle 6. The members 5 are shouldered at their upper ends as indicated at 7 and the shouldered portions are provided with alined openings 8 for receiving a set screw 9 or other fastener for securing said members together with the major portion thereof in spaced relation. Intermediate the ends of the standards the same are provided with alined openings 10 for receiving the end of a shaft 11 and thus provide a bearing therefor, said shaft having a handle 12 and also a gear 13 mounted on the shaft 11 in the space between the standards 5.

Each standard 5 is provided in its outer face with a longitudinal recess 14, extending through the lower end of the standard. Disposed in the recesses 14 are the ends of a wire supporting frame 15, the extremities of which are bent to form eyes 16 and which lie in enlarged upper portions of the recesses which are secured therein by screws 17 engaged through the eyes. In this way the frame 15 is detachably secured to the standards as will be readily understood, the engagement of the end portions of the frame in the recesses 14 holding the standards in alinement with the supporting frame.

As shown in the drawings, the upper portions of the frame 15 lie in parallel relation and the lower portions are bowed outwardly as indicated at 18, and below the bowed portions the frame includes two parallel straight portions 19 connected at their lower ends by a transverse bottom portion 20.

The frame 15 thus includes two side portions 15', and mounted upon each of these side portions there is a beater 21 including a lower circular portion 22' and spaced upwardly extending side portions 25. The circular portions of the beaters are provided with openings 21' engaged with the portions 19 of the frame 15.

The side portions 25 of each beater lie at opposite sides of the corresponding portion 15' of the frame and the upper extremities of these portions 25 are bent inwardly in overlapped relation and receive the portion 15' of the frame therethrough. These inwardly turned portions are indicated at 26 in the drawing, and fast upon each of the portions 15' of the frame 15 there is a stop 22 which lies directly beneath the lowermost portion 26, receiving the latter thereupon.

Revolubly engaged upon each portion 15' of the frame 15 and resting upon the upper most inturned portion 26 in each instance there is a beveled gear 23, these gears meshing with the gear 13 as illustrated, and each of these gears carries a pair of spaced depending lugs 27 which lie at opposite sides of the inturned portions 26 and in engagement with the latter so that the beaters 21 are rotated with the gears 23 when the gear 13 is rotated by means of the handle 12.

From the foregoing it will be seen that the structure shown and described provides a device which may be readily assembled at a minimum expense, and it will be seen, further, that by mounting the gear 13 between the two standards 5 the shaft 11 is given a bearing at each side of the gear and that thus the latter will be prevented from wabbling and will be maintained always in proper relation to the gears 23.

What is claimed is:—

1. An egg beater including a body comprising spaced arms adjustably connected for movement toward and away from each other, a double bevel gear rotatably mounted between the arms and having means for rotating it, a beveled pinion supported from each arm and movable therewith toward and away from meshing engagement with the opposite faces of the gear respectively, and a beater carried by each pinion.

2. An egg beater comprising a body including spaced arms, adjustably connected for movement toward and away from each other, a crank shaft journaled in the arms, a double bevel gear mounted between the arms upon the crank shaft, a yieldable frame having its ends connected respectively with the arms for movement therewith, the frame being constructed and arranged to hold the arms against rotation with respect to each other, pinions mounted upon the frame and engaging the faces of the bevel gear respectively, and a beater connected with each pinion.

In testimony whereof, I affix my signature in the presence of two witnesses.

FRANK R. COLLINS.

Witnesses:
W. H. ROGERS,
P. McLACHLIN.

Copies of this patent may be obtained for five cents each, by addressing the "Commissioner of Patents, Washington, D. C."